US010812858B2

(12) United States Patent
Zabetian

(10) Patent No.: US 10,812,858 B2
(45) Date of Patent: *Oct. 20, 2020

(54) TEMPORARY MODIFYING OF MEDIA CONTENT METADATA

(71) Applicant: Google LLC, Mountain View, CA (US)

(72) Inventor: Mahboud Zabetian, Orinda, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,829

(22) Filed: Oct. 15, 2018

(65) Prior Publication Data

US 2019/0052928 A1    Feb. 14, 2019

Related U.S. Application Data

(63) Continuation of application No. 15/495,783, filed on Apr. 24, 2017, now Pat. No. 10,104,427.

(51) Int. Cl.
| | |
|---|---|
| *H04N 21/84* | (2011.01) |
| *H04N 21/4402* | (2011.01) |
| *H04N 21/4788* | (2011.01) |
| *H04N 21/431* | (2011.01) |
| *H04N 21/2743* | (2011.01) |

(Continued)

(52) U.S. Cl.
CPC ..... *H04N 21/4402* (2013.01); *G06F 16/7867* (2019.01); *H04N 21/2743* (2013.01); *H04N 21/41407* (2013.01); *H04N 21/435* (2013.01); *H04N 21/4312* (2013.01);

(Continued)

(58) Field of Classification Search
CPC ......... H04N 21/4402; H04N 21/41407; H04N 21/8133; H04N 21/2743; H04N 21/4312; H04N 21/435; H04N 21/4627; H04N 21/4788; H04N 21/84; G06F 16/7867
See application file for complete search history.

(56) References Cited

U.S. PATENT DOCUMENTS 9,118,723 B1    8/2015   Su et al.
10,104,427 B1 *  10/2018  Zabetian .......... H04N 21/41407
(Continued)

OTHER PUBLICATIONS

PCT Search Report & Written Opinion, Re: Application # PCT/US2018/014847, dated Mar. 28, 2018. (12 pages).

(Continued)

*Primary Examiner* — Junior O Mendoza
(74) *Attorney, Agent, or Firm* — Lowenstein Sandler LLP

(57) ABSTRACT

A method includes accessing, at a first client device associated with a first user account on a media hosting service, a content item provided by the media hosting service. The method further includes receiving an input of a first user associated with the first user account to modify metadata of the content item. A modification of the metadata comprises at least one of an obscuration, removal, or replacement of the metadata. The method also includes obtaining an identifier of the content item. The identifier of the content item indicates the modification of the metadata of the content item. The method furthermore includes sending, to a second client device associated with a second user account on the media hosting service, the identifier of the content item to cause the content item to be presented on the second client device with the modified metadata.

20 Claims, 11 Drawing Sheets

(51) Int. Cl.
    *H04N 21/4627*   (2011.01)
    *H04N 21/435*     (2011.01)
    *H04N 21/81*      (2011.01)
    *G06F 16/78*      (2019.01)
    *H04N 21/414*     (2011.01)

(52) U.S. Cl.
    CPC ..... *H04N 21/4627* (2013.01); *H04N 21/4788* (2013.01); *H04N 21/8133* (2013.01); *H04N 21/84* (2013.01)

(56) References Cited

U.S. PATENT DOCUMENTS

| | | | |
|---|---|---|---|
| 2009/0208180 A1 | 8/2009 | Ashby et al. | |
| 2013/0124480 A1* | 5/2013 | Chua | G06F 16/48 707/644 |
| 2014/0047358 A1 | 2/2014 | Park et al. | |
| 2014/0050419 A1* | 2/2014 | Lerios | G06T 3/0056 382/276 |
| 2014/0101244 A1* | 4/2014 | Klein | G06Q 10/101 709/204 |
| 2014/0297745 A1* | 10/2014 | Tarbox | H04L 65/604 709/204 |
| 2015/0156227 A1* | 6/2015 | McCall | H04L 65/60 709/204 |
| 2015/0220634 A1 | 8/2015 | Hughes | |
| 2016/0044385 A1 | 2/2016 | Kareeson et al. | |
| 2016/0149956 A1* | 5/2016 | Birnbaum | H04L 63/101 726/1 |
| 2017/0094019 A1* | 3/2017 | Ahmed | H04L 67/327 |

OTHER PUBLICATIONS

International Preliminary Report on Patentability for Application No. PCT/US2018/014847 dated Nov. 7, 2019, 10 pages.

* cited by examiner

TEMPORARY MODIFYING OF MEDIA CONTENT METADATA

RELATED APPLICATIONS

This continuation application claims priority to U.S. patent application Ser. No. 15/495,783, filed on Apr. 24, 2017 and entitled "TEMPORARY MODIFYING OF MEDIA CONTENT METADATA," which is incorporated by reference herein.

BACKGROUND

Field of Art

This disclosure relates generally to modifying metadata of content and more particularly modifying metadata of content when the content is shared between users.

Description of the Related Art

The sharing of video content on websites has developed into a phenomenon, supported by numerous websites. Many thousands of media are posted every day, and this number is increasing as the devices and opportunities for capturing video become easier to use and more pervasive.

As this phenomenon has increased, so too has the ability of media to go 'viral' and spread to millions of viewers in a matter of hours. Sometimes, as the video is shared, the metadata shared with the video (e.g. title, creator, etc.) provides too much context for a potential viewer and the potential viewer chooses not to view the video thereby decreasing the video's impact. For example, one friend sends a second friend the video with the title, "Baby lizard escapes horde of snakes." The second friend can choose not to view the video because the title of the video gives away the ending of the video.

SUMMARY

A creator client device, a sharer client device, a viewer client device, and a media hosting service participate in a content sharing interaction in which the metadata of the content is modified and shared between devices, i.e. a modified sharing interaction. The media hosting service provides a platform for the devices to host and share content, as well as modify the metadata associated with that content. At various points during the modified sharing interaction, users interacting with the client devices can modify the metadata. In one example, the creator client device can upload a video to the media hosting service with metadata associated with the video such as an author and title. The sharer client device shares the video with the viewer client device with an indication that the meta data of the video will be modified using the media hosting service. In this example, the title and author of the video can be obscured from view on the viewer client device. While viewing the video, the viewing client device can unmodify the modified metadata. In this example, the viewer client device can choose to reveal the previously obscured title and author of the video. The media hosting service can monitor metadata that is modified during modified sharing interactions to influence future modified sharing interactions.

In one embodiment, a first client device associated with a first user account receives a content item for display. The content item includes content item metadata associated with the content item and sender metadata associated with a second user account and associated with the content item. The content item is displayed on the first client device such that a modified portion of the content item metadata is displayed. In response to receiving an input from the first device user, an unmodified portion of the content item metadata is displayed. The displayed unmodified portion of the content item was previously displayed as the modified portion of metadata.

In one embodiment, the content item is sent to the first client device in response to a send action initiated by the second user account on a second client device. In still another embodiment, the sender metadata can include a flag indicating that the metadata of the content item for displaying is to be modified. The flag can be created in response to an input from the second user account.

In one embodiment, the content item is created by a third user account on a third client device dissimilar from the first client device. Displaying the modified portion of the content item metadata can be further based on creator metadata generated by the third user account. The creator metadata can include a flag, the flag indicating that the metadata of the content item for displaying is to be modified.

In one embodiment, a non-transitory computer readable medium stores instructions for modified sharing interactions. The instructions are executed by a processor and cause the processor to implement the method described herein.

In one embodiment, a system includes a media hosting service, a sharer client device, a viewer client device, and a creator client device to share content with modified metadata. The system participates in modified sharing interactions using the method herein.

The figures depict various embodiments of the present invention for purposes of illustration only. One skilled in the art will readily recognize from the following discussion that alternative embodiments of the structures and methods illustrated herein can be employed without departing from the principles of the invention described herein.

DETAILED DESCRIPTION

The modified sharing interaction in the described environment aids users sharing content with modified metadata. The modified sharing interaction can be one of, or any number of, the interactions between client devices and a media hosting service that facilitates the uploading of content to the media hosting service, manipulating and adding metadata associated with the content, searching of the content on the media hosting service, sharing the content between users, modifying and revealing metadata associated with the content, and collecting usage information the metadata associated with the content throughout the modified sharing interaction.

Figure 1:
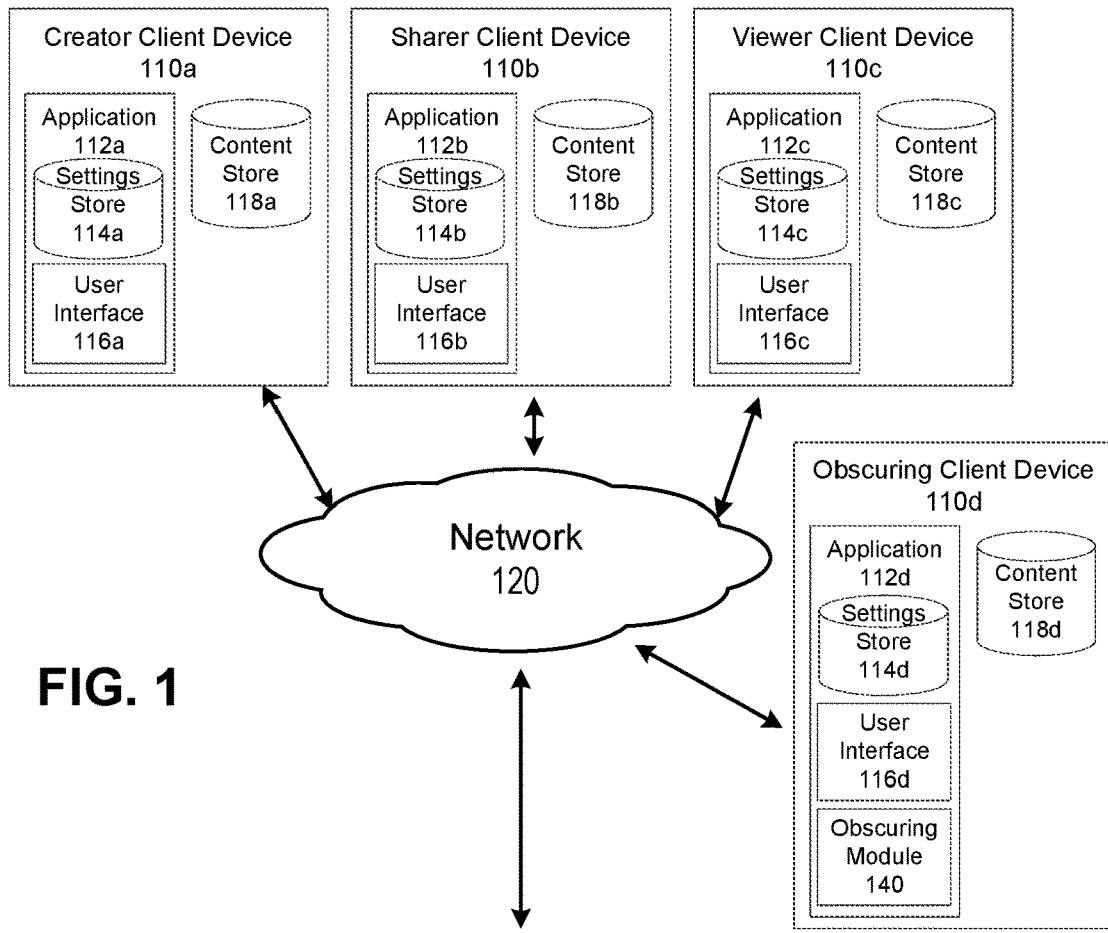
FIG. 1 illustrates an example computing environment for modified sharing interactions using a modifying module, according to one example embodiment.
Figure 1:
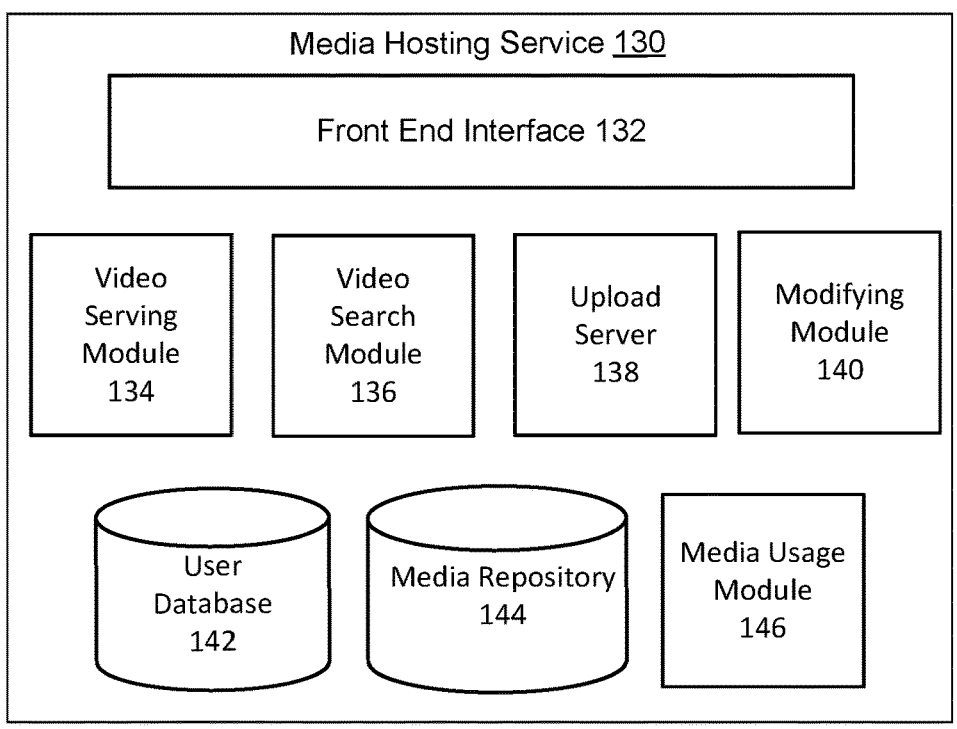

FIG. 1 shows an example computing environment 100 for a modified sharing interaction using a modifying module, according to some embodiments. For example, client device 110 users can share content among client devices 110a-110c without revealing metadata associated with that content, e.g. sending media without revealing the title. The devices 110a-110d can include an application 112 that provides the ability to share media and metadata associated with the media. The associated metadata can be modified (e.g., obscured, removed, or replaced) during the modified sharing interaction. Obscured metadata is used as one of example of modified metadata throughout this document. The application 104 can interact with the front end interface 132, (i.e. a presentation layer such as a web-page), of the video hosting service 130 and with other applications within the environment 100 to facilitate sharing of content with modified metadata.

Each client device 110 is a computer or other electronic device used by one or more users to perform activities including uploading media, participating in a modified sharing interaction, and viewing media content (e.g. video, audio, text, links, documents, etc.) received from the media hosting service 130. The client device 110, for example, can be a personal computer executing a web browser or dedicated software application that allows the user to browse and search for media available at the media hosting service 130 web site via the front-end interface 132. In other embodiments, the client device 110 is a network-capable device other than a computer, such as a mobile phone, personal digital assistant (PDA), a tablet, a laptop computer, a wearable device, a networked television or "smart TV," etc.

The client devices 110 include software applications, such as application 112, which execute on the processor of the respective client device 110 to communicate with one another and with media hosting service 130 (e.g. during an modified sharing interaction). The application executing on the client device 110 performs various functions for interacting with other applications and modules of the client device and for participating in an modified sharing interaction between client devices 110 and the media hosting service 130. Examples of such applications can be a web browser, a social networking application, a messaging application, a gaming application, and a media consumption application. Each application 112 can be linked to a user account on the media hosting service 130 associated with a client device 102 or the client device user or group of client device users. In some embodiments the user account can be accessed via the front end interface 132 of the media hosting service 130.

The settings data store 114 contains metadata and information associated with the device user, the client device 110, a user account, etc. The metadata and information can be used by the environment 100 during an modified sharing interaction to facilitate sharing modified metadata between the devices within the environment 100. In one embodiment, the information and metadata can be used to tailor modified sharing interactions to specific devices, user accounts, groups of devices and groups of user accounts (e.g., what metadata is obscured, how long the metadata is obscured, which users in modified sharing interactions can modify metadata, etc.). Metadata and associated information can include: inter-device security metrics, intra-device security metrics, network security metrics, authentication protocols, user account information and preferences, client device information and preferences, device user information and preferences, a record of preferences and changes, and location based information. For example, the settings data store 114 can contain metadata as to the history of modified sharing interactions between two devices and the modifying module 140 can modify metadata based on the previous modified sharing interactions of the devices.

The user interface 116 includes input devices for data entry and output devices for display. The output devices can display content provided by the client device 110, the media hosting service 130, or the user of the client device. The input devices can enable the user to take an action (e.g. an input) to interact with the application 1112 or media hosting service 130 via the front end interface 132. These actions cancan include: typing, speaking, tapping, clicking, swiping, or any other input interaction. For example, a content creator using a creator client device 110a can upload content to the media hosting service 130. A sharer using a sharer client device 110b can search for the content using the front end interface and video search module and send the content to a viewer using the viewer client device 110c via the network 120. In some embodiments, the interactions between two client devices 110 and interactions between a client device 110 and the media hosting service 130 can include information or metadata that is associated with the media or with the modified sharing interaction.

The user interface 116 (e.g. FIGS. 2A-2D) is a display that allows a user to interact with the client devices 110 during a modified sharing interaction. The user interface can process inputs that can affect the modified sharing interactions in a variety of ways, such as: displaying new information on the user interface, causing a modified sharing interaction, displaying media or metadata during the modified sharing interaction, manipulate metadata associated with content, or any of the other interactions, processes, or events described within the environment 100 during a modified sharing interaction.

The content store 118 is the storage system where the content files are transmitted to and received from the media hosting service 130 are stored.

The network 120 represents the communication pathways between the client devices 110 and the media hosting service 130. In one embodiment, the network 120 is the Internet, but can also be any network, including but not limited to a LAN, a MAN, a WAN, a mobile, wired or wireless network, a cloud computing network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The media hosting service 130 serves media (e.g. videos) to client devices 110 via the network 120. The media hosting service 130 includes a media repository 144 storing media and a front end interface 132 for interacting with the client device 110. The media hosting service 130 receives requests from client devices 110 for the media in the media repository 144 and serves the media in response. In addition, the media hosting service 130 can receive, store, process, and serve media uploaded by users of the client devices 110 and by other entities. The media in the media hosting service 130 can be obtained from a variety of sources. For example, media can be obtained from a user, e.g., as submitted by a user uploading a video from the content store 118 on a client device 110 to a media repository 144 on the media hosting service 130 via the network 120 using the upload server 138.

The media hosting service 130 comprises a number of "modules," which refers to hardware components and/or computational logic for providing the specified functionality. A module can be implemented in hardware, firmware, and/or software (e.g., a hardware server comprising computational logic). It will be understood that the named components represent one embodiment of the disclosed method, and other embodiments can include other components. In addition, other embodiments can lack the components described herein and/or distribute the described functionality among the components in a different manner. Additionally, the functionalities attributed to more than one component can be incorporated into a single component. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the media hosting service 130, loaded into memory, and executed by the one or more processors of the system's computers.

The front end interface 132 can be the presentation layer of the media hosting service 130 that allows users to interact with the back end data manipulation modules of the media hosting service 130. The front end interface 132 receives requests from client devices and communicates with the other aspects of the media hosting service 130 in order to process the requests. The front end interface 132 can be accessed via a web browser or via an application 112 installed on a client device. Particularly, for example, the front end interface 132 allows the user of the client device 110 to interact with the media hosting service 130 to participate in a modified sharing interaction. The front end interface 132 can further provide elements of the user interface 116 to the client devices 110, particularly in web based implementations where the user interface is provided as part of a web page rather than as part of a dedicated software application. The front end interface 132 is further configured to collect user interactions with the media hosting service 130. For example, if a user clicks on a web page, views a video, makes a purchase, opens a document, fills a web-based form, chooses to modify (e.g. obscure or reveal) metadata associated with shared media, the front end interface 132 collects these interactions. Additionally, interactions between different items presented by the media hosting service 130 are collected by the front end interface 132 and are recorded in the modules, servers, and storage units of the media hosting service.

The media serving module 134 receives requests from client devices to view (or play back) a specific media item from the media hosting service 130. From the client device perspective, a device can execute a request by browsing the different categories within the media hosting service 130, receiving an input indicating a click on a link to a video from a search results webpage, or by accessing information and metadata associated with an modified sharing interaction (e.g. click a history of interactions). The request transmitted by the client device can include the identifier of the content the user wishes to access (this can be included automatically once the user clicks on the link for the video). The media serving module 134 uses the identifier to search and locate where the video is stored in the media repository 144. The media serving module 134 provides the media requested from the media hosting service 130 to the client device 110 for display on the user interface 116. In some embodiments, the media serving module can use the identifier to serve media with the metadata modified.

The video search module 136 processes any search query received by the media hosting service 130 from a user via the client device 110. The search query transmitted by the client device 110 to the media hosting service 130 includes search criteria, such as keywords, that can identify media the user is interested in viewing. The video search module 130 uses the search criteria to query the metadata of video files stored in the media repository 144. The search results from the query are transmitted to the client device 110 via the network 120 so that the search results can be presented to the user via the user interface 116.

Any content received via the network 124 from a client device for posting to the media hosting service 130 is passed on to the upload server 138 from the content store 118 on a client device via the network 120 for processing. The processing of the content file includes assigning an identifier to the newly received content. Processing the media can additionally include formatting (e.g., transcoding), compressing, metadata tagging, content analysis, and/or other data processing methods. The client device 110 transmits information with the video file transmitted to the media hosting service 130. The information can describe the video (e.g., title, description, and tag information). The information can also include an indication of the media type, which for uploaded media would can be the "video" type. The upload server 138 stores the processed content in a media repository 144 and stores the information as metadata of the content.

The modifying module 140 can modify (e.g. obscure and reveal) metadata of shared content during a modified sharing interaction. The modifying module 140 can receive a request from the sharer client device 110b to modify the metadata of media stored in the media repository 144 when shared with the viewer client device 110c. When the viewer client device 110b accesses the media via the front end interface or the media is provided to the viewer client device with the media serving module 134 the modifying module 140 provides modified metadata associated with the video to the viewer client device. The media hosting service can also receive a request from the viewer client device to modify metadata associated with the video, and the modifying module can provide the modified metadata to the viewer client device.

Alternatively, rather than withholding and providing the modified metadata on request, the modifying module 140 can instead provide the metadata associated with the video to the viewer client device with an indicator that the application 112c operating on the viewer client device should obscure the metadata. The viewer client device can request that the metadata associated with the video is revealed and the application operating on the viewer client device reveals the metadata that was previously flagged to be obscured.

Modifying the metadata associated with the media during an modified sharing interaction can be accomplished in several different ways: rendering the text of the metadata illegible (e.g. blurring, blacking out, etc.), removing the obscured metadata from view (e.g. not displaying the metadata), providing an image to display in front of the metadata, providing alternative text to display in front of the metadata, providing alternative metadata to display in place of the obscured metadata, or any other method or combination of methods for modifying metadata information associated with the video. Further modification of the metadata can reverse any of these modifying techniques (e.g. revealing obscured metadata, or obscuring revealed metadata).

Throughout the shared interaction event, client devices can request (or determine) to modify (e.g. obscure or reveal the metadata) media. This request can be made using a variety of methods including: clicking an icon on the user interface of a client device 110, reading or sending a flag that metadata should be modified, appending new metadata to the video, typing an input into a client device 110, changing the URL associated with the location of the video in the media hosting service (e.g. from a URL of the video with unmodified metadata to a URL of the video with modified metadata), modifying or changing the identifier of the video (e.g. from an identifier of the video with unmodified metadata to an identifier of the video with modified metadata), or any other similar method in the environment 100. In some embodiments, the modifying or revealing of the metadata can be accomplished automatically using a variety of methods including: accessing settings stored in the settings data store 114 of a client device, accessing information or metadata stored in the user database 142, or interaction with the media usage module 146.

The user database 142 stores information and metadata that can be presented to a user or utilized by other modules in the media hosting service to facilitate functionality during a modified sharing interaction. The user database 142 can include metadata associated with a user, a user account, media, or client devices. The metadata can include geographic location, preferences, device information, device settings, or any other information associated with the user or the user interactions within the environment 100, particularly that information which can be useful to an modified sharing interaction.

The media repository 144 is the storage system where the content files received from and transmitted to the client devices 110 are stored. The media repository 144 can be a computer readable persistent storage device (e.g. RAM, hard drive, etc.) of the media hosting service 130.

The video usage module 146 collects, stores, and updates metadata associated with content stored by the media hosting service 130. Content can be accompanied by associated metadata such as: an identification number, title, author, tags, descriptions, icons, thumbnail views, comments, number of views, and a rating. The metadata can be updated based on interactions between a user and a client device, between client devices, a client device and the media hosting service, a client device and the network, or any other interactions in the environment 100. The video usage module 146 can also contain information regarding previous similar interactions, e.g. if one user has already sent a video to another user. The video usage module 140 can interact with the modifying module 140 to obscure metadata during an modifying interaction to collect usage of obscured media or to obscure media based on usage information metadata.

For example, a first client device sends a video to a second client device. The first client device indicates that the video should have its metadata obscured during a modified sharing interaction. The video usage module 146 recognizes that second client device previously received the video from a separate client device in a separate modified sharing interaction. The video usage module can notify the first or the second client device that the video has been previously viewed, previously obscured, previously shared, etc. In a similar example, the second client device has not viewed the video shared during the modified sharing interaction. The second client device views the video with the obscured metadata which is then revealed after viewing. The video usage module 146 can update and store the metadata associated with the video and the interaction (e.g. increasing a view count, marking media as viewed, marking media as shared, etc.).

To simplify and clarify the present description, the content received and shared by the media hosting service 130 can be referred to as video, video files, or video items, but it should be understood that the media hosting service 130 can receive and share content of any media type. This content can be referred to as media, media items, or items. Thus, the operations of the modifying module described herein for modifying media in modified sharing interactions can be applied to any type of media item, not only videos; other suitable type of content items include audio files (e.g. music, podcasts, audio books, and the like), documents, multimedia presentations, digital purchases of goods and services, and so forth. Each item's metadata includes an indication of the type of media for that item, for example, video, audio, document, purchase, or presentation.

To further simplify and clarify the present description the following example modified sharing interaction will be used hereafter: Chris, a first client device user 110a, creates a video and uploads the video to the media hosting service 130. John, a second client device 110b user, accesses the video via the media hosting service. John chooses to send the video to Anne, a third client device 110c user, with the metadata obscured. Anne accesses the video to watch via the media hosting service 130 with the metadata obscured and can choose to reveal the obscured metadata. Throughout the modified sharing interaction, the metadata is updated and the server can notify Chris, John, and Anne.

Figure 2A:
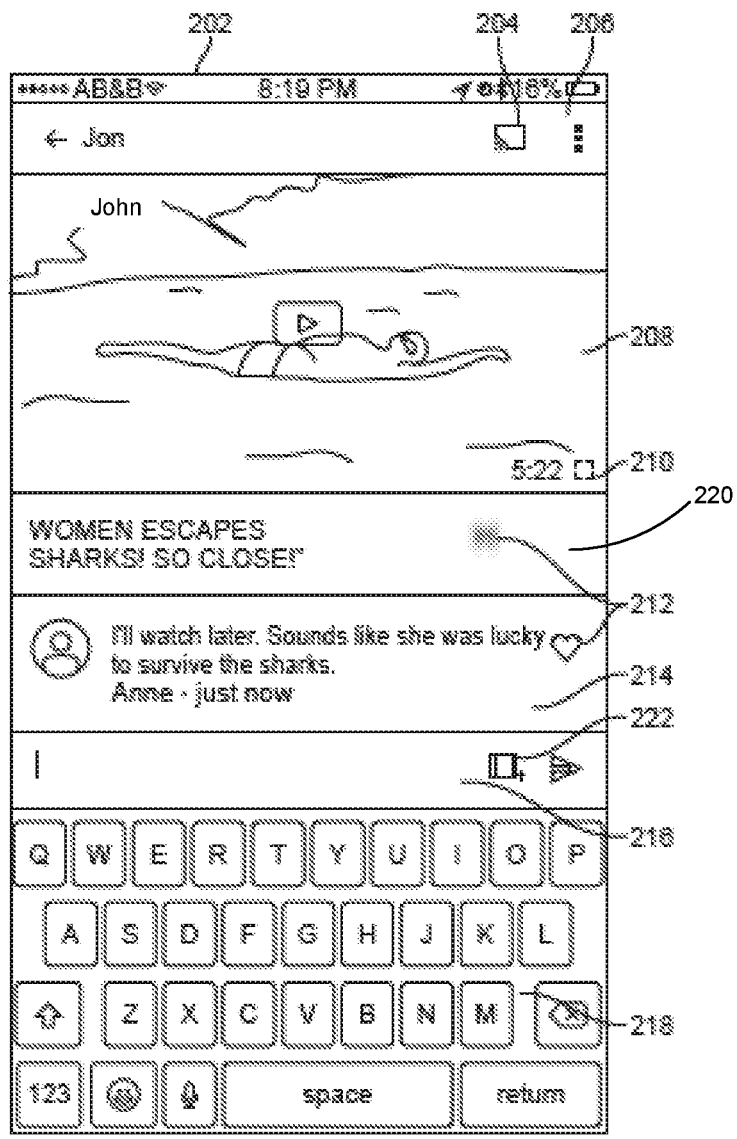
FIG. 2A an illustrative example of the user interface of a device participating in a modified sharing interaction in which the metadata associated with a video is not obscured, according to one example embodiment.

FIG. 2A an illustrative example user interface displayed on a client device participating in a sharing interaction in which the metadata is not obscured. John sends a video to Anne in which the metadata of the video reveals important aspects of the media storyline, e.g. "Woman escapes sharks! So close!" Anne can choose not to watch the video because the metadata associated with the video presented to her during the sharing interaction provides too much context, e.g. "I'll watch later. Sounds like she was lucky to survive the sharks." In these conventional types of sharing interactions, the viewing user can choose not to view the content limiting the virality and spread of the shared content.

The user interface 202 can include a visual representation of any of the users interacting in the obscured sharing event, an user interface (UI) element 204 that allows connecting with other applications or devices within the environment, or an UI element 206 that allows accessing and manipulating settings within the settings module.

The user interface includes an area 208 for viewing content associated with an modified sharing interaction. The area 208 can include an icon or icons that will stop or start the content playback, indicators of metadata associated with the video (i.e. video length, video quality, captioning, etc.). The area 208 can also be expanded or reduced via interactions with an interface icon 210 or by settings within the settings module. The user interface also includes an area 220 for displaying metadata associated with the video and can be obscured during an modified sharing interaction. The user interface includes an area 214 that will display interactions between the participants in the modified sharing interaction. This area is configured to display text, video, or any other information or metadata associated with the obscured sharing event. The user interface includes an icon or icons 212 for interacting with the metadata. These icons when selected can indicate sentiment about metadata, modify (e.g. obscure or reveal) metadata, send or receive metadata, or any other interaction described within. The user interface includes an area 216 that allows for input from the client device. Accessing this area can generate an input interface such as a keyboard 218 or the keyboard can be permanently displayed. The area can also include a UI element 222 for inputting other types of data such as video, links, pictures, etc. In some embodiments, information or metadata displayed within the area 214 can also be obscured during an modified sharing interaction.

Figure 2B:
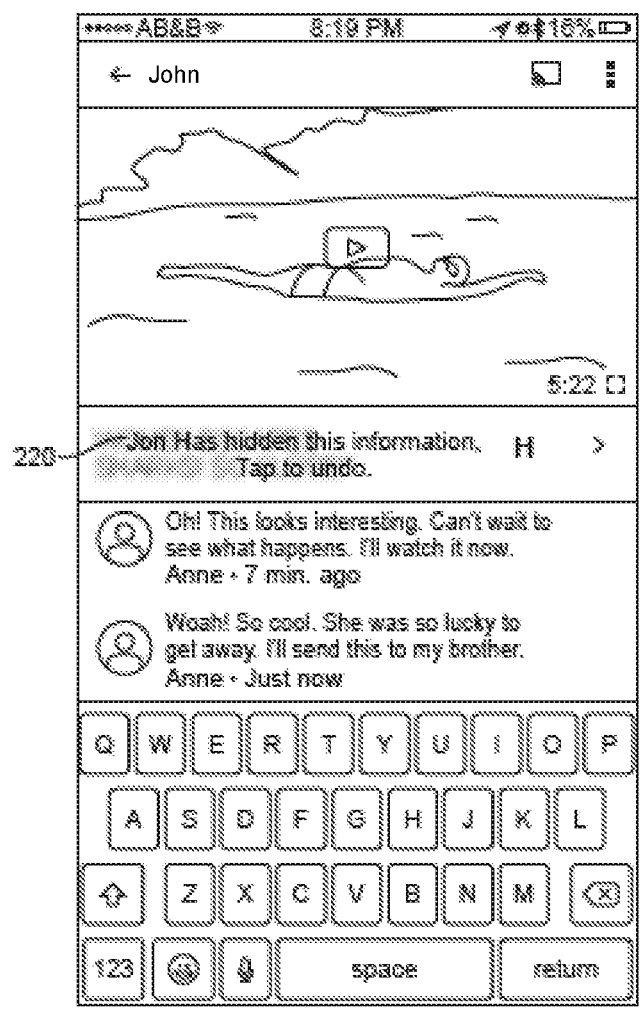
FIG. 2B is an illustrative example of the user interface of a device participating in a modified sharing interaction in which the metadata associated with a video is obscured, according to one example embodiment.

FIG. 2B is an illustrative example of the user interface of a device participating in an modified sharing interaction in which the metadata associated with a video is obscured. John sends Anne a video and the metadata is obscured, e.g. the video title is rendered illegible and has an overlay stating "John has hidden this information. Tap to undo." Anne can send John a message indicating that she is interested in watching the video and can proceed to watch the video because she does not know the outcome or topic, e.g. "Oh! This looks interesting. Can't wait to see what happens. I'll watch it now." Anne watches the video and the metadata can be revealed via several methods as described by processes described below. She notifies John that she has watched the video, is impressed by the video and will share it with her brother, e.g. "Whoa! So cool. She was so lucky to get away. I'll send this to my brother." Modified sharing interactions can increase the viewership of online media and encourage virality of the media.

Figure 2C:
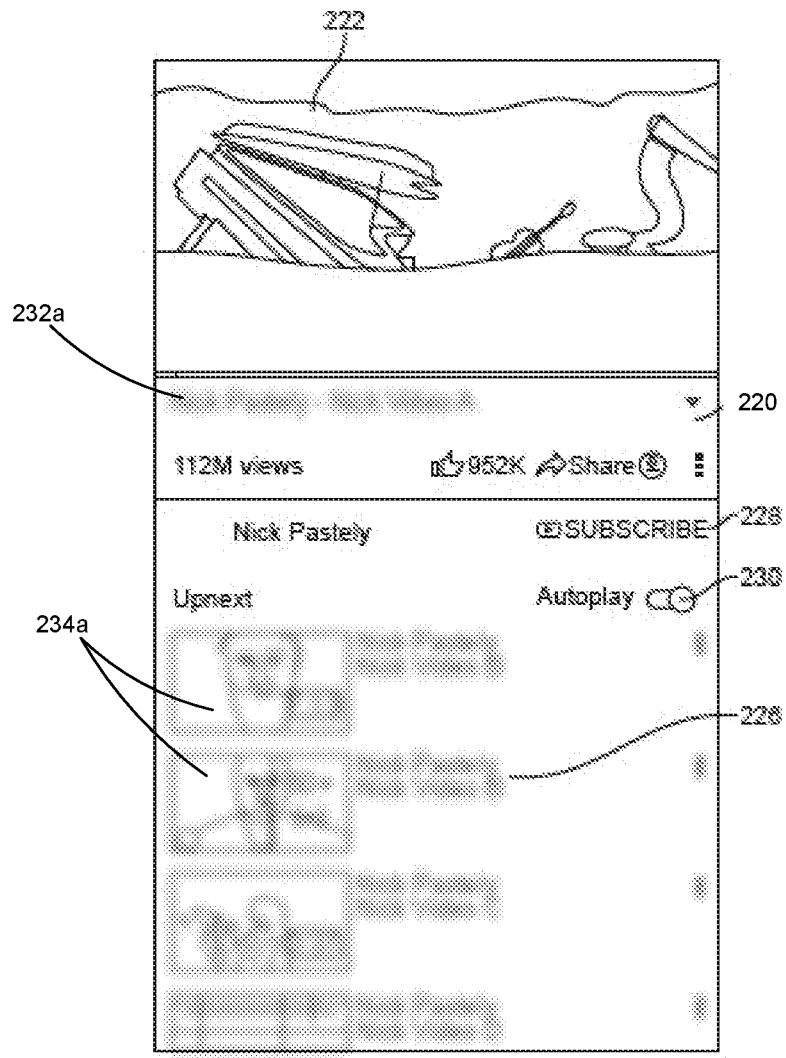
FIG. 2C is an illustrative example of the user interface of a client device participating in a modified sharing interaction accessing the front end interface of the media hosting service in which the metadata associated with a video is obscured, according to one example embodiment.

FIG. 2C is an illustrative example of the user interface of a client device participating in a modified sharing interaction accessing the front end interface of the media hosting service in which the metadata of a video is obscured. At least some of the metadata associated with the video is obscured from the view user, including the title and associated suggested videos.

The user interface can include an area 222 for displaying the content that can be expanded or reduced, icon or icons that will stop or start the content playback, and indicators of metadata associated with the video (i.e. video length, video quality, captioning, etc.). The user interface includes an area 220 for displaying metadata associated with the video and can be obscured during a modified sharing interaction. The user interface includes icons 228 that allow for subscribing to content from the content creator. The user interface includes an area 226 that displays content and metadata stored within the environment associated with the content shared in the shared modifying interaction. In the illustrated example, the content in this area has been obscured during the modified sharing interaction. The user interface can include icons 230 to interact with other content and metadata stored within the environment associated with the content shared in the modified sharing interaction.

Figure 2D:
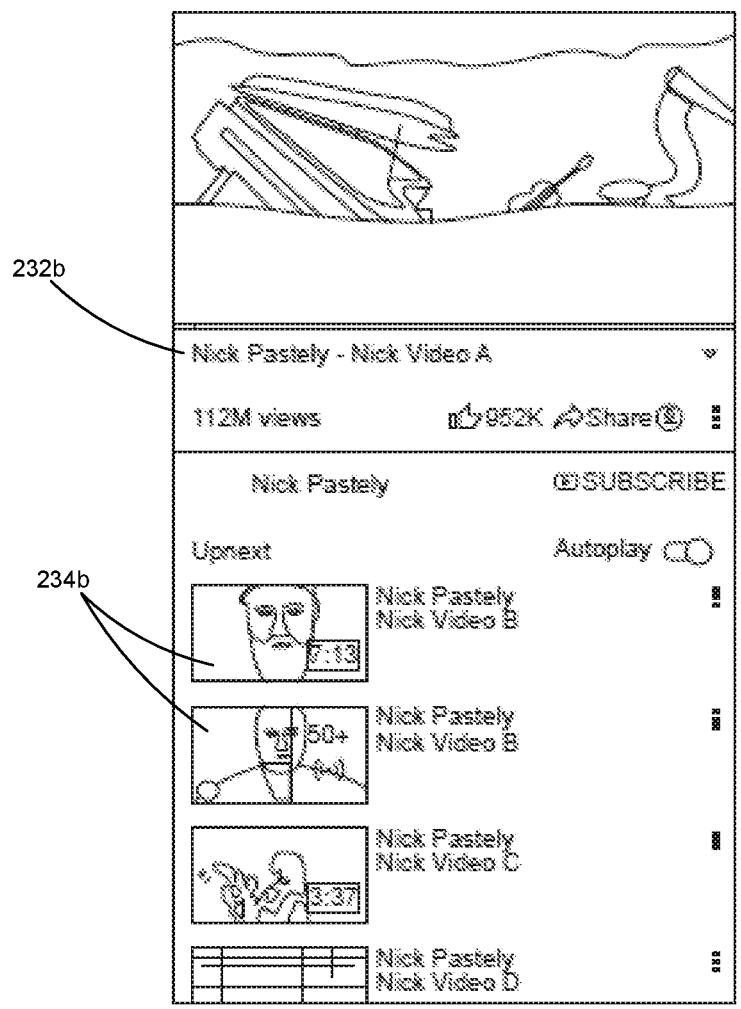
FIG. 2D is an illustrative example of the user interface of a client device participating in a modified sharing interaction accessing the front end interface of the media hosting service in which the metadata of a video is revealed, according to one example embodiment.

FIG. 2D is an illustrative example of the user interface of a client device participating in a modified sharing interaction accessing the user interface of the media hosting service in which the metadata associated with a video is revealed. At least some of the metadata associated with the video has been revealed to the viewing user, including the title and associated suggested media. Using the examples of FIGS. 2C and 2D the metadata of the video (e.g. the title 232a) and associated metadata (e.g. the up-next videos 234a) have been obscured in FIG. 2C. After a user of the client device selects to reveal the obscured metadata of the video (e.g. the title 232b), and associated metadata (e.g. the up-next videos 234b) are revealed. The elements of the user interface described above can be alternatively oriented within the interface. The user interface can also include elements not described above but still allow for an modified sharing interaction. In some embodiments, elements of the user interface can be displayed within in other applications of the client device (e.g. aspects of the user interface displayed in a web-browser).

Figure 3:
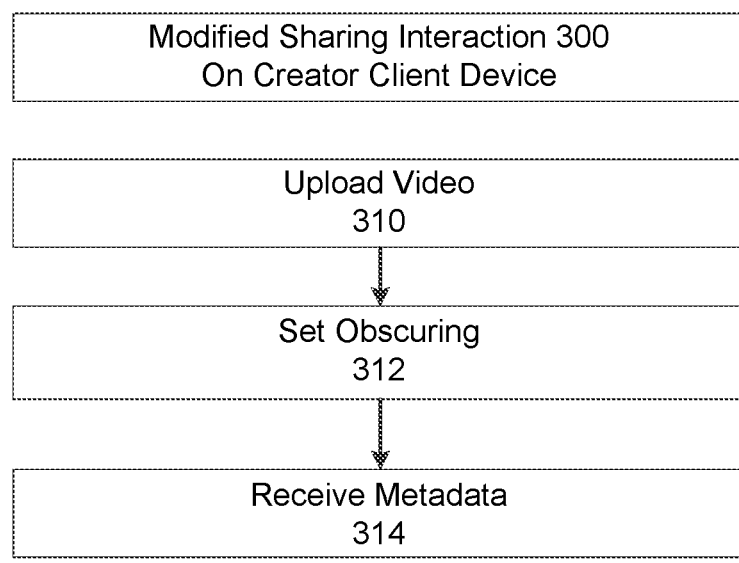
FIG. 3 illustrates the process flow that occurs on the sharer client device during a modified sharing interaction, according to one example embodiment.

FIG. 3 illustrates the process that occurs on the creator client device during a modified sharing interaction 300, according to one embodiment. The creator client device 110a can upload 310 a video to the media hosting service 130 from the content store 118a on the client device over the network 120. The creator client device 110a can interact with the front end interface 132 and video upload server 138 to store the video in the media repository 144 and create a set of metadata associated with the video. The creator client device 110a can interact with the modifying module 140 and send 312 the modification settings for the video to the video hosting service such as: length of time for modifying, if the media can be modified during modified sharing interactions (e.g. modifying of the media is disallowed/allowable/forced), which types of metadata can be obscured (e.g. titles, device information, etc), which parts of metadata can be obscured (e.g. only part of a title rather than the whole title) etc.

For example, Chris has digitally re-mastered the iconic music video "Never gonna let you down—Nick Pastley" and stored it in the content store 118a on his creator client device 110a. The creator client device receives an input to upload the video to the media hosting service via 130 the network 120 via the user interface 116a of the application 112a. The creator device 110a interacts with the front end interface 132 and upload server 138 to add metadata to the video such that the video can be searched using the video search module 138. Chris has no intent for encouraging virality of his video. The creator client device 110a instructs the modifying module that, by default, the modifying module 140 will not obscure metadata associated with the video when shared between users. The creator client device 110a determines to allow certain aspects of the metadata to be obscured when shared between device users when instructed by the sharer client device 110b in a modified sharing interaction.

The creator client device 110a can receive 314 updated metadata associated with the video. The creator client device 110a can receive this metadata from the video usage module 146 of the media hosting service 130 or directly from an application operating other client devices 110 in the environment 100. The received metadata can include: notification that devices have shared/received the video, notification that the users of the devices has chosen to reveal/obscure the shared video and metadata, notification that the obscured metadata was automatically revealed, etc. The received metadata can be used in other aspects of modified sharing interactions.

Figure 4:
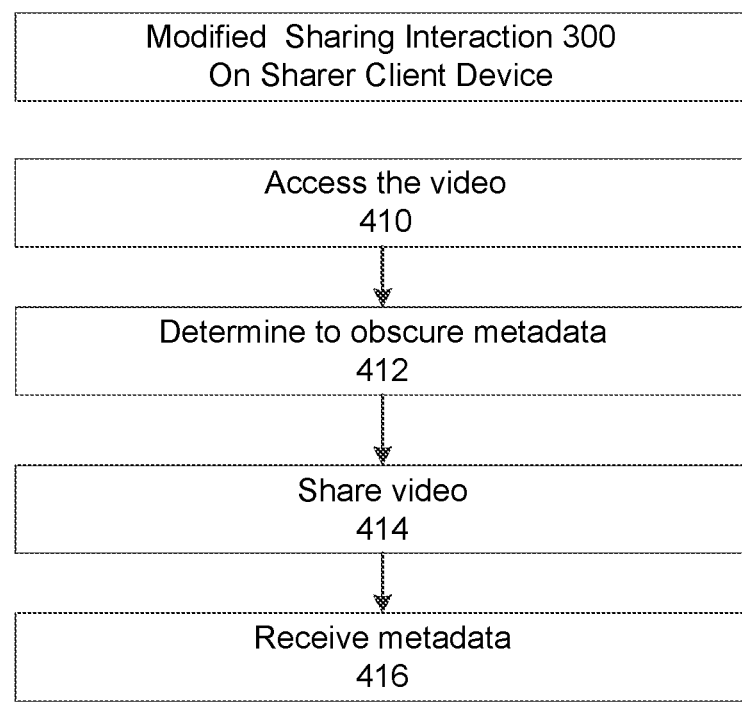
FIG. 4 illustrates the process flow that occurs on the viewer client device during a modified sharing interaction, according to one example embodiment.

FIG. 4 illustrates the process that occurs on the sharer client device 110*b* during a modified sharing interaction 300. During the modified sharing interaction 300, the sharer device 110*b* can access 410 the video through media hosting service 130 via the network 120 using the user interface 116*b* of the application 112*b*. The sharer device can interact with the front end interface 132 (e.g. via user input) of the media hosting service 130 to share a video from the media repository 144 during the modified sharing interaction 300. The media hosting service 130 can provide the video to the sharer client device 110*b* for play back on the user interface 116*b* using the media serving module 134 when the video is accessed. In other embodiments, accessing the video can only provide metadata associated with the video to the sharer client device 110*b*.

For example, John's sharer device can access a video on the media hosting service 130 by searching the term "Nick Pastley" and clicking "Never gonna let you down—Nick Pastley," the first item that is provided by the user interface 132 media hosting service 130 on the user interface of his device 110*b*. The media hosting service 130 provides the video and its metadata to John's sharer device via the network and the sharer device can select (e.g. via user input) to view the metadata for the video without play back. In one embodiment, the settings module 114 of John's sharer device authenticates his device to the media hosting service 130 and the media hosting service provides the video to his device 110*b* configured to display on John's device.

After accessing the video, the sharer client device 110*b* can determine 412 (e.g. via user input or information stored in the settings data store 114*b*) to obscure the metadata associated with video during the modified sharing interaction 300. The determination to obscure the metadata of a video in a modified sharing interaction 300 can add a new type (e.g. a notification that metadata has been obscured) or additional metadata (e.g., an obscured version of the media metadata, etc.) associated with the video. During an modified sharing interaction 300, when determining to obscure metadata, the sharer client device 110*b* can select (e.g. via user input) which metadata and/or portions of metadata that are associated with the video is to be obscured or revealed. In still other embodiments, the sharer client device 110*b* can change, replace, or insert new metadata (e.g. from user input, the modifying module 140, the settings data store 114, etc.) to display as obscured or revealed during an modified sharing interaction, e.g. enter a replacement title to a video or a tag that indicates whom has obscured the metadata. The metadata that is changed, replaced, or inserted during a modified sharing interaction can be shared as a notification between the devices participating in the modified sharing interaction or be displayed on any available area of the user interface 116 of the participating client devices 110 where the original data might otherwise be shown. The sharer device can also determine (e.g. from the user input, the modifying module 140, the settings data store 114, etc.) to provide video playback offset metadata to indicate where video playback will start. The offset metadata can be provided to avoid displaying embedded titles or spoilers to the viewer client device at the beginning of video playback. The modifying module 140 modifies the appropriate metadata based on the determination.

For example, after accessing 310 the video "Never gonna let you down—Nick Pastley," John's client device can determine to obscure the video metadata by receiving user input that is provided by a user (e.g., John) selecting a UI element that is labeled "Obscure video metadata" in the user interface of the sharer client device. In one embodiment, John's sharer device determining to obscure the video metadata provides John's sharer device with options of which metadata to obscure; i.e. all or part of the "Title," "Artist," "Views," "Associated Media," etc. John's sharer device selects "Title" and "Artist" for modifying by receiving an user input representing the selected options. In another embodiment, John's device automatically selects "Title" and "Artist" as the video metadata to obscure based on settings stored in the settings data store 114 of John's device 110*b*. John's sharer device selects (e.g. via user input) to insert representative metadata associated with the video to display with the obscured metadata, e.g. "Check out this hilarious fat cat video!" John's sharer device also selects (e.g. via user input) to replace the artist of the video from "Nick Pastely" to "John's Grandma." In another embodiment, settings in the settings module of John's sharer device automatically inserts the representative metadata "John has chosen to hide the video title and artist. Click to undo."

After choosing to obscure metadata during a modified sharing interaction 300, the sharer client device 110*b* can share 414 the video and obscured metadata with a disparate viewer client device 110*c* via the network 120. Sharing the video can include sharing any of the metadata associated with the video used for identifying the video including: the identifier of the video stored in the media repository, the URL of the video, a shortlink to the video, the title of the video, a clickable icon representing the location of the video in the media repository, an interaction location on the user interface, or similar. Sharing the video and the metadata can occur using several different communication protocols or combination of communication protocols configured to interact with the network in the environment 100; i.e. an SMS message, a message using an application on a client device, an email message, or any other method of communication that can be used for device to device interaction. The video usage module 146 can store and update any metadata associated with the sharing a video and the media obscured metadata.

For example, John's sharer device can send the video "Never gonna let you down—Nick Pastley" and metadata associated with the video (e.g. obscured metadata, instructions to obscure metadata, inserted metadata, etc). John's sharer device sends the video using an SMS message containing a shortlink representing the identifier for the location of the video in the media repository 144 of the media hosting service 130. The shortlink can include metadata associated with the modified sharing interaction, e.g. a flag for the media hosting service that the metadata for the video should be obscured when the shortlink is clicked.

After sharing the video (or the location of the video in the video hosting service) in the modified sharing interaction 300, the sharing device can receive 416 updated metadata associated with the video or metadata associated with the modified sharing interaction. The sharing device 110*b* can receive this metadata from the video usage module 146 of the media hosting service 130 or directly from an application 104 operating on another client device 110 in the environment 100. The received metadata can include: notification that the viewer client device 110b has received the video, notification that the viewer client device 110b has chosen reveal the obscured metadata, or notification that the obscured metadata was automatically revealed, etc.

For example, John's sharer device can receive a notification on his device 110b from the video usage module 146 that Anne's viewer device received the video with obscured metadata, accessed the video for play back using the media hosting service 130, and that the obscured metadata was automatically revealed.

Figure 5:
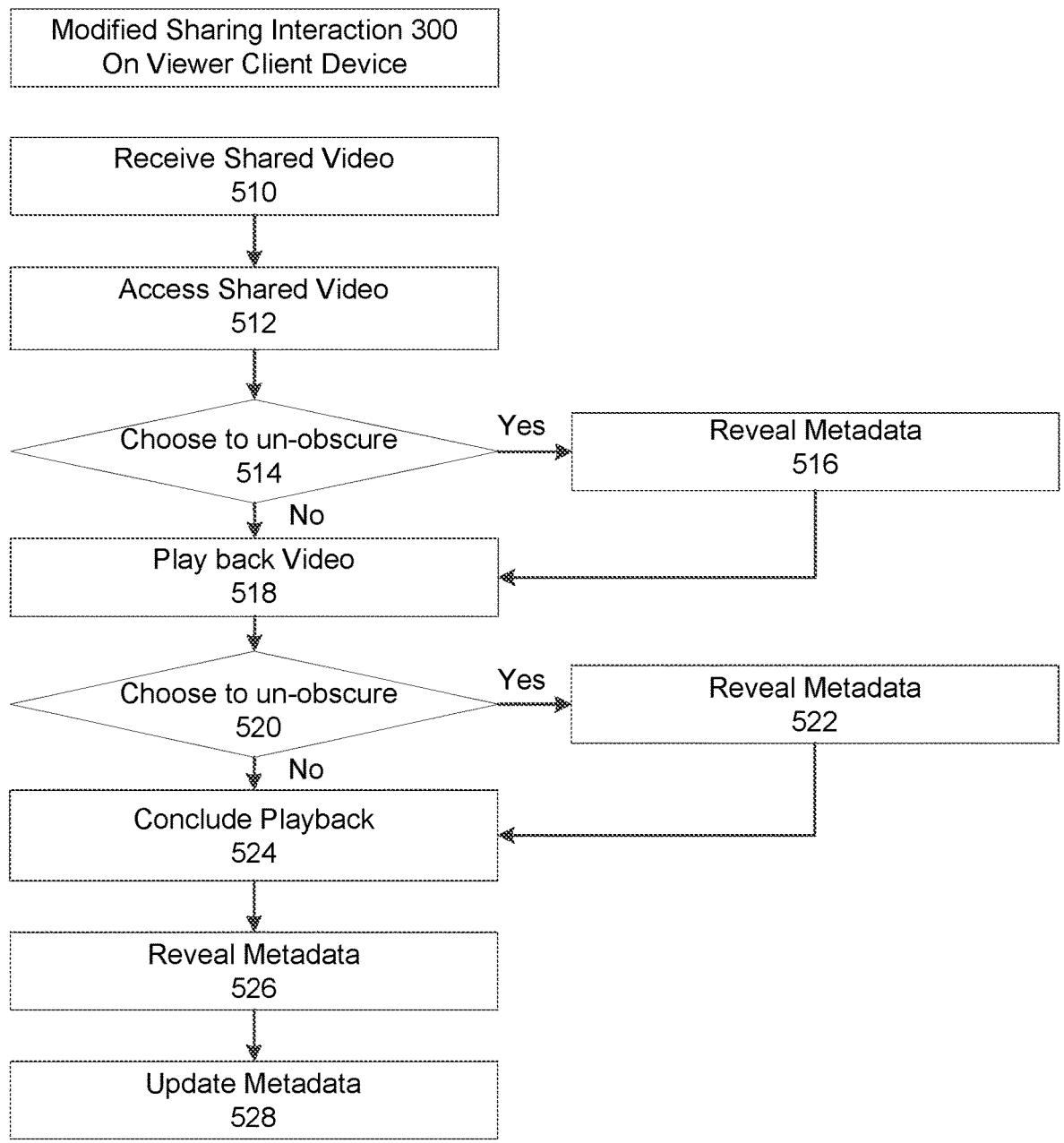
FIG. 5 illustrates the process that occurs on the creator client device during a modified sharing interaction, according to one example embodiment.

FIG. 5 illustrates the process that occurs on the viewer client device 110c during an modified sharing interaction 300. The viewer client device 110c can receive 510 the shared video (or the location of the video in the media hosting service 130) and video metadata from the sharer client device 110b. The video metadata received from the sharer can be at least partially obscured by the modifying module 140 of the media hosting service 130. Receiving the video can occur in several ways using any combination of sharing methods and communication protocols within the environment 100 as previously described. The video usage module 146 can store and update any metadata associated with the modified sharing interaction.

For example, Anne's viewer device can receive an SMS from John containing a shortlink representing the identifier for the location of the video in the media repository 144 of the media hosting service 130. The message and shortlink can also include information that the metadata associated with the video is to be obscured by the modifying module 140 (See FIG. 1) when accessed on the viewer client device 110c. For example, rather than modifying the metadata stored within the media hosting service, when Anne's viewer device selects the link, the media hosting service provides obscured metadata to her viewer device.

The viewing client device 110c can access 512 the video and the obscured metadata using the identifier provided by the sharer client device. The viewer client device 110c can access the video and the metadata through media hosting service 130 via the network 120 using the user interface 116c of the application 112c running on the viewer client device 110c. The viewer client device can use the user interface 132 of the media hosting service 130 to enter the identifier of the media location in the media repository 144. At least some of the metadata associated with the video accessed by the viewer client device is displayed on the viewer client is obscured by the modifying module 140 (See FIG. 1). In one embodiment, the media hosting service 130 can provide the video to the viewer client device 110b for automatic play back on the user interface 116b using the media serving module 134 when the video is accessed. In other embodiments, accessing the video can only provide revealed metadata associated with the video to the viewer client device and does not provide the obscured metadata associated with the video. Access to the video via the media hosting service 130 can be determined by settings stored in the settings module 114c of the client device or the user database 142 of the media hosting service 130.

For example, Anne's viewer device can access a video John's sharer device sent her on the media hosting service 130 by clicking on the shortlink that John's sharer device sent her viewer device via SMS message. The media hosting service 130 provides the video, e.g. "Never gonna let you down—Nick Pastley," for Anne's viewer device to view on the application 112c of her device 110c. Rather than the original metadata associated with the video being displayed the viewer device, obscured metadata (e.g. a blurred view count of the video) and metadata modified (e.g. a different title than the original title of the video) by John's sharer device are provided for Anne's viewer device to view, e.g. "Check out this hilarious fat cat video!" alongside a blurred video title and artist details. See the description of the modifying module 140 with FIG. 1. The settings module 114c of Anne's device can contain a preference that allows the media hosting service 130 to provide obscured metadata to her device.

After accessing the video, Anne's viewer device can choose 514 to reveal 516 the obscured metadata of the video or play back 518 the video. The viewer client device can 110c choose 514 to reveal the obscured metadata by interacting (e.g. via user input) with the front end interface 132 and modifying module 140 of the media hosting service 130 using the user interface 116c of the application 112c. The viewer client device 110c sends a request to the media hosting service 130 and modifying module 140 to reveal the metadata and the media hosting service 130 and modifying module 140 reveals the obscured metadata. In an alternate embodiment, requesting revealed metadata from the media hosting service is not required and the reveal happens locally on the application 112c of the viewer client device 110c.

Alternatively, the viewer client device can choose to play back 518 the video by interacting with the user interface 132 and media serving module 134 of the media hosting service 130 using the user interface 116c of the application 112c. The media hosting service 130 provides the video to the viewer client device 110c for play back on the user interface 116c using the media serving module 134. Choosing to obscure, revealing obscured metadata, and play back of the video can be determined by settings stored in the settings data store 114c of the client device or the user database 142 of the media hosting service 130.

For example, Anne chooses to reveal the obscured metadata on the client device before initiating play back by clicking an icon presented to her on the user interface of her device. The metadata that John chose to be obscured is revealed and the displayed metadata becomes the metadata originally associated with the video, e.g. "Check out this hilarious fat cat video!" becomes "Never gonna let you down—Nick Pastley" and un-blurs any metadata. In another embodiment, Anne initiates play back by pressing a play icon on the user interface without revealing the obscured metadata and the video "Never gonna let you down—Nick Pastley" starts to play.

Similarly to previous description, at any point during play back 518 of the video the viewer client device can choose 520 to reveal 522 obscured metadata if the metadata has not already been revealed.

The video play back can conclude 524 and the viewer client device can again choose to reveal 426 the obscured metadata if the metadata has yet to be revealed, similarly to previously described. In some embodiments, the obscured metadata is automatically revealed using the modifying module 140 of the media hosting service 130 at the conclusion video play back. See the description of the modifying module 140 with FIG. 1. Automatically revealing the metadata can also be can be determined by settings stored in the settings data store 114c of the client device or the user database 142 of the media hosting service 130.

Subsequently, metadata associated with the interaction (e.g. an indication that the video has been viewed) and the metadata associated with the video (e.g. a view count) is updated 528 (automatically or via user input) with the video usage module 146 of the media hosting service 130. In some embodiments, the metadata associated with the interaction or with the video can be updated during any step of the process of FIG. 4 and/or FIG. 5.

Figure 6:
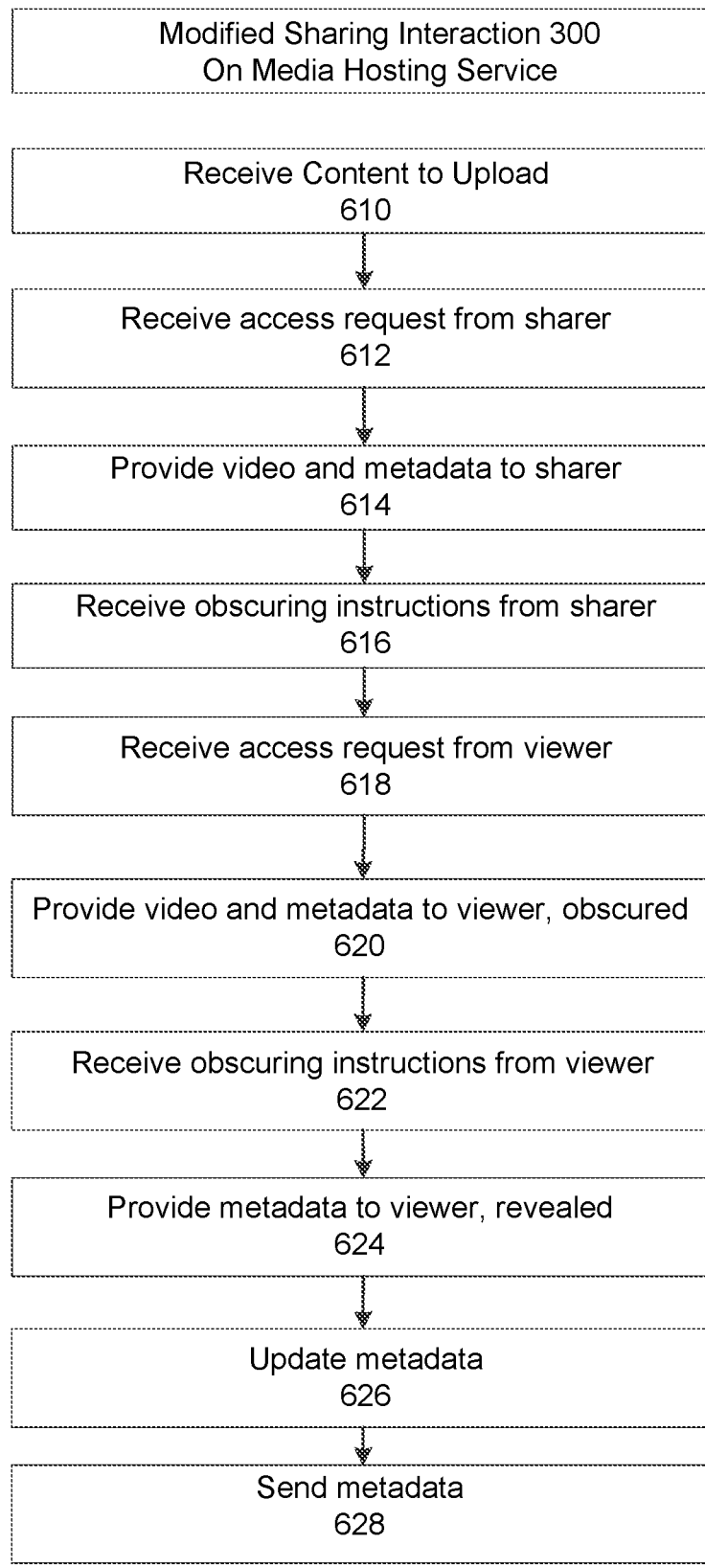
FIG. 6 illustrates the process that occurs on the media hosting service during a modified sharing interaction, according to one example embodiment.

FIG. 6 illustrates the process that occurs on the media hosting service 130 during an modified sharing interaction 600. The media hosting service 130 receives 610 video content to upload to the media repository from the creator client device 110*a* interacting with the user interface 132 and the upload server 138. The media hosting service receives 612 an access request for the video in the media repository from the sharer client device interacting with the user interface and the video search module. The media hosting service provides 614 the video and the associated video metadata to the sharer client device using the media serving module. The media hosting service receives 616 instructions from the sharer client device interacting with the user interface to obscure metadata using the modifying module. The media hosting service modifies the metadata using the modifying module. The media hosting service receives 618 a request from the viewer client device to access the video in the media repository. The access request can include instructions (e.g. metadata associated with the video, or a user input) that the metadata associated with the video is to be obscured on the viewer client device or the media hosting service can have stored information (e.g. user settings) that the viewer client device is to receive obscured metadata during this modified sharing interaction.

The video host service provides 620 the video and metadata associated with the video to the viewer client device, with the at least some of the metadata obscured by the modifying module. In some embodiments, the media hosting service receives 622 instructions to reveal the obscured metadata with the modifying module 140 from the viewer client device. The media hosting service can then provide 624 the requested revealed metadata to the viewer client device. See the description of the modifying module 140 in FIG. 1. At any point during the above process the media hosting service can update 628, and/or store, to the creator client device, the sharer client device, or any device associated with the interaction in the environment 100, metadata associated with the video (or metadata associated with the modified sharing interaction) using the video usage module 146. At any point during the above process the media hosting service can send 628 metadata associated with the video or metadata associated with the obscured sharing event to the creator client device, the sharer client device, or any device associated with the event in the environment 100 using the video usage module.

Figure 7:
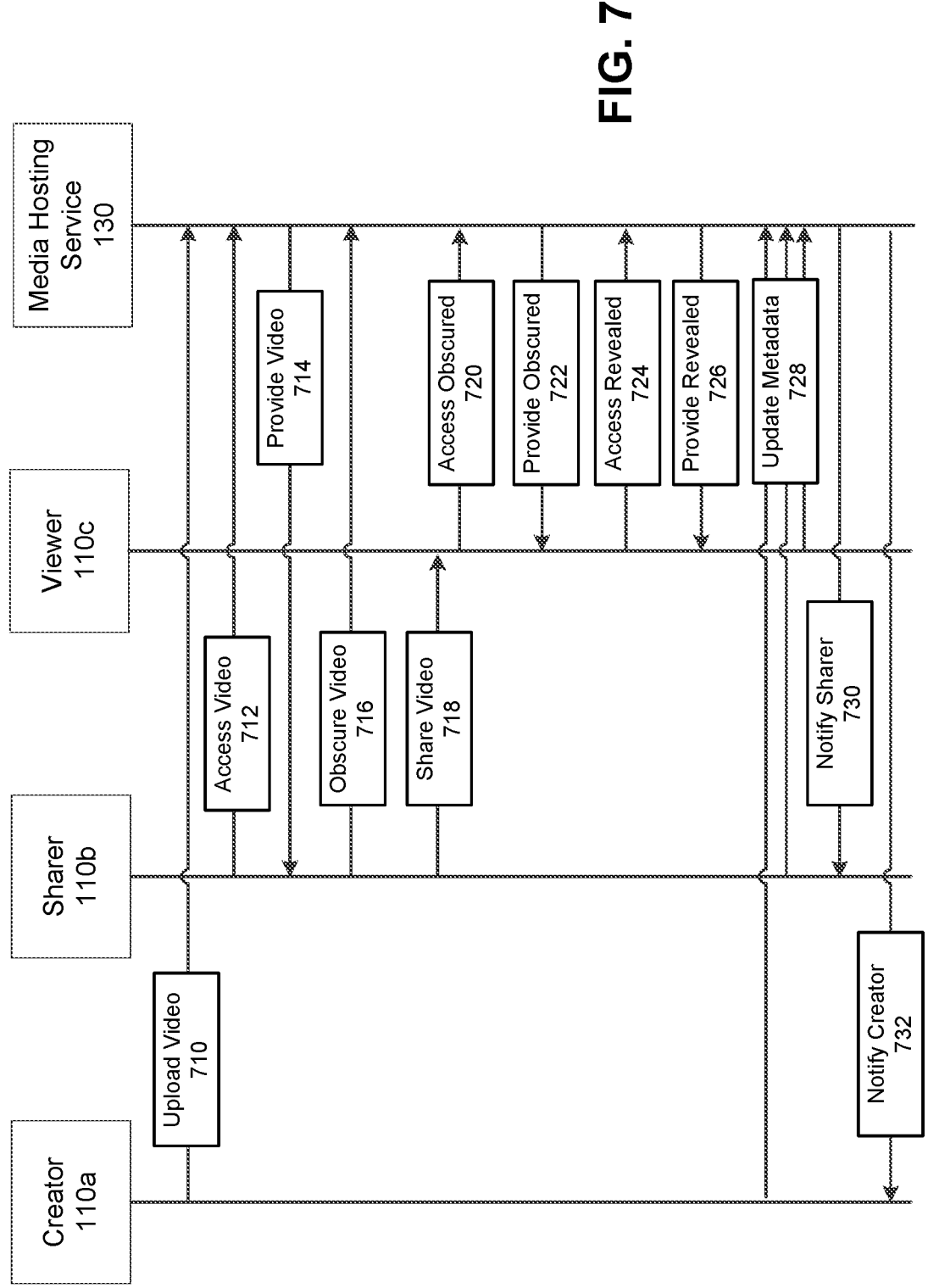
FIG. 7 is an interaction diagram for the modified sharing interaction between the creator client device, the sharer client device, the viewer client device and the media hosting service, according to one embodiment.

FIG. 7 is an interaction diagram for the modified sharing interaction 300 between the creator client device 110*a*, the sharer client device 110*b*, the viewer client device 110*c* and the media hosting service 130, according to one embodiment. The creator client device uploads 710 a video to the media hosting service 130 from the content store 118*a* on the client device 110*a* via the network 120 using the user interface 116*a* of the application 116*a*. During the upload the creator can interact with the front end interface 132 of the media hosting service 130 to access the upload server 138 to upload the video and to assign metadata to the video when it is uploaded.

The sharer client device 110*b* accesses 712 the video, for example, by searching for the video using the video search module 136 on the media hosting service 130. The sharer client device accesses the front end interface 132 of the media hosting service 130 via the network 120 using the user interface 116*b* of the application 112*b*. Accessing the video can occur by entering (e.g. into the user interface 116) an identifier identifying the location of the video stored in the media repository 144.

The media hosting service 130 provides 714 the video and metadata associated with the video to the sharer client device 110*b* using the media serving module 134. The video and video metadata can be provided to the client device 110*b* interacting with the front end interface 132 of the media hosting service 130 using the application 110*b* and user interface 116*b* on the sharer client device 110*b*. In some embodiments, providing the video to the sharer device 110*b* configures the video for play back on the user interface 116*b* of the sharer client device 110*b*. In other embodiments providing the video to the sharer client device 110*b* only provides the video and video metadata to the sharer client device.

The sharer client device obscures 716 the video metadata for further use in the modified sharing interaction 300 using the modifying module 140 of the media hosting service 130. The sharer client device accesses the front end interface 132 of the media hosting service 130 via the network 120 using the user interface 116*b* of the application 112*b* to interact with the metadata associated with the video via the modifying module 140.

The sharer client device 110*b* shares 718 the video with the viewer client device 110*c*. Sharing the video can be accomplished via any communication method using any communication protocol within the environment 100 that can provide an identifier associated with the location of the video within the media hosting service 130 to another client device. The identifier can contain metadata indicating that the video should have its metadata obscured during the modified sharing interaction 300.

The viewer client device 110*c* accesses 720 the video on the media hosting service 130 using the identifier provided by the sharer client device 110*b*. The metadata of the video is obscured by the modifying module 140 of the media hosting service 130. The viewer client device accesses the video using the front end interface 132 of the media hosting service 130 via the network 120 using the user interface 116*b* of the application 112*b*.

The media hosting service 130 provides 722 the video and metadata associated with the video to the viewer client device 110*c* using the media serving module 134 with the metadata obscured by the modifying module 140. The video and video metadata can be provided to the client device 110*c* interacting with the front end interface 132 of the media hosting service 130 using the application 110*c* and user interface 116*bc* on the viewer client device 110*b*. The user can choose to reveal the obscured metadata when the video is provided. In some embodiments, providing the video to the viewer device 110*c* configures the video for playback on the user interface 116*c* of the viewer client device 110*c*. The user can choose to reveal the obscured metadata when the video is being played back on the viewer device 110*c* or the video metadata can be automatically revealed after the video has played back.

After the viewer client device chooses the reveal the video metadata, the viewer client device 110*c* can access 724 the revealed metadata from the media hosting service 130 using the modifying module 140. The viewer client device accesses the revealed metadata using the front end interface 132 of the media hosting service 130 via the network 120 using the user interface 116*b* of the application 112*b*. In some embodiments, revealing the metadata on the viewer client device 110*c* does not necessitate communication with the media hosting service 130 and occurs locally within the application 112*c*.

The media hosting service 130 provides 726 the revealed metadata associated with the video to the viewer client device 110*b* using the modifying module 140. The revealed metadata can be provided to the client device 110*c* interacting with the user interface 132 of the media hosting service 130 using the application 110*c* and user interface 116*bc*.

At any point during an modified sharing interaction 300, the metadata associated with the video can be updated 728 and stored using the video usage module 146 of the media hosting service or any other module interacting with metadata in the environment 100. Further, the metadata associated with any of the client devices, user accounts, or users in the environment 100 can be updated and stored during an modified sharing interaction 300. In some embodiments, the metadata can be updated by a client device 110 interacting with the user interface 132 and video usage module 146 of the media hosting service 130 using the application 112*c* and the user interface 116.

At any point during an modified sharing interaction 300, the server can notify 730 the sharer client device 110*b* or notify 732 the creator client device 110*c* of changes to metadata associated with the video or metadata associated with she modified sharing interaction 300. Notifying the creator client device and sharer client device can occur by interacting with the front end interface 132 and video usage module 146 of the media hosting service 130 using the application 112*c* and the user interface 116*c* of the viewer client device 110*c*. In other embodiments, the creator client device 110*a* and sharer client device 110*b* are automatically notified of changes in the metadata using the video usage module 146.

In some configurations of the client devices 110 and media hosting service 130, the media hosting service does not participate in the modifying the metadata and solely shares the video content during the modified sharing interaction 300. In these configurations, a client device 110 participating in an modified sharing interaction 300 can receive the video identifier associated with the obscured video which includes obscuration metadata associated with the modified sharing interaction 300 indicating metadata to obscure on the participating devices 110. The client device 110 can interpret the identifier, parse the identifier to a separate video identifier, and use the separate video identifier to access the unobscured video from the media hosting service 130. The client device 110 can internally obscure the metadata associated with the video indicated by the previously received obscuration metadata. This in-application modifying can be accomplished by an modifying client device 110*d* with an modifying module 140 within the application 112*d* or by built in functionality of the application 112 on the client devices 110.

At any point during an modified sharing interaction 300, the interaction between modules, applications, devices, servers, and stores can be subject to settings and preferences stored in the settings of the client device settings modules 114, the user database 142, and the video usage module 146. The settings and preferences can include: play back settings, metadata that can be accessed, user account settings, security and authentication protocols, user preferences, client device settings and configurations, or any other metadata associated with the environment 100.

In modified sharing interactions in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 8:
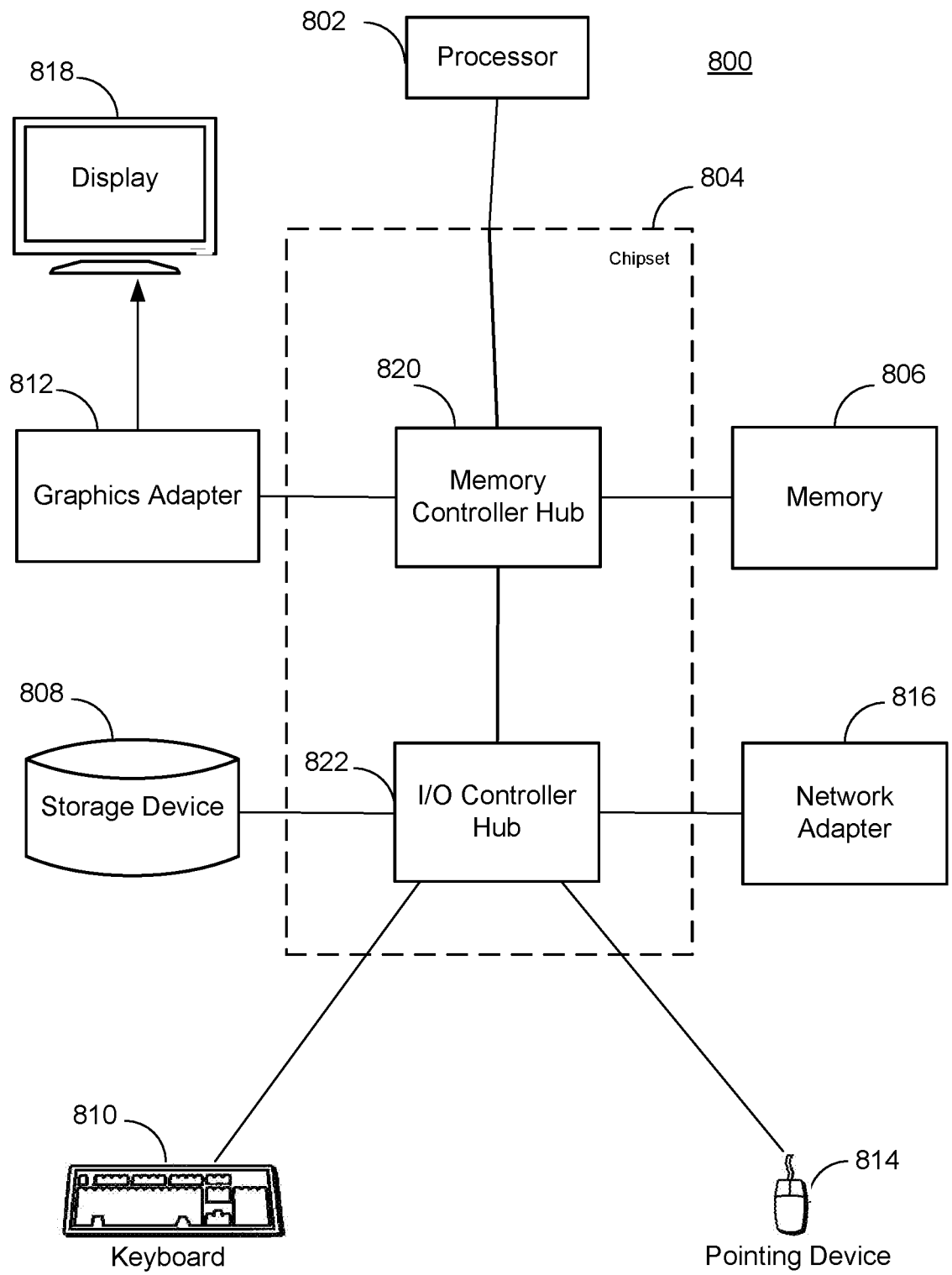
FIG. 8 is a high-level block diagram illustrating an example of a computer for use as a video hosting server or client device.

FIG. 8 is a high-level block diagram illustrating an example of a computer 800 for use as a video hosting server 130 or client device 110. Illustrated are at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display device 818 is coupled to the graphics adapter 812. A storage device 808, keyboard 810, pointing device 814, and network adapter 816 are coupled to the I/O controller hub 822. Other embodiments of the computer 800 have different architectures. For example, the memory 806 is directly coupled to the processor 802 in some embodiments.

The storage device 808 is a non-transitory computer-readable storage medium such as a hard drive, compact disk read-only memory (CD-ROM), DVD, or a solid-state memory device. The memory 806 holds instructions and data used by the processor 802. The pointing device 814 is a mouse, track ball, or other type of pointing device, and is used in combination with the keyboard 810 to input data into the computer 800. The graphics adapter 812 displays frames and other information on the display device 818. The network adapter 816 couples the computer 800 to a network. Some embodiments of the computer 800 have different and/or other components than those shown in FIG. 1. The types of computer 800 can vary depending upon the embodiment and the desired processing power. The computer 800 can comprise multiple servers working together to provide the functionality described herein.

In some embodiments, the computer 800 can be a component of a cloud computing network. The computer 800 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 808, loaded into the memory 806, and executed by the processor 802.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules can be embodied in software, firmware, hardware, or any combinations thereof.

Any of the steps, operations, or processes described herein can be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments can also relate to an apparatus for performing the operations herein. This apparatus can be specially constructed for the required purposes, and/or it can comprise a general-purpose computing device selectively activated or reconfigured by a computer program stored in the computer. Such a computer program can be stored in a non-transitory, tangible computer readable storage medium, or any type of media suitable for storing electronic instructions, which can be coupled to a computer system bus. Furthermore, any computing systems referred to in the specification can include a single processor or can be architectures employing multiple processor designs for increased computing capability.

Embodiments can also relate to a product that is produced by a computing process described herein. Such a product can comprise information resulting from a computing process, where the information is stored on a non-transitory, tangible computer readable storage medium and can include any embodiment of a computer program product or other data combination described herein.

Finally, the language used in the specification has been principally selected for readability and instructional purposes, and it can not have been selected to delineate or circumscribe the inventive subject matter. It is therefore intended that the scope of the invention be limited not by this detailed description, but rather by any claims that issue on an application based hereon. Accordingly, the disclosure is intended to be illustrative, but not limiting, of the scope of the invention, which is set forth in the following claims.

What is claimed is:

1. A method comprising:
   presenting, via a graphical user interface (GUI) of a first client device associated with a first user account on a media hosting service, a content item and metadata associated with the content item provided by the media hosting service, wherein the metadata comprises at least one of a title, an identification number, an author, a tag, or a popularity indicator for the content item;
   receiving, at the first client device, an input of a first user associated with the first user account to modify the metadata of the content item, wherein a modification of the metadata comprises at least one of an obscuration, removal, or replacement of the metadata;
   obtaining an identifier of the content item, the identifier of the content item indicating the modification of the metadata of the content item; and
   sending, to a second client device associated with a second user account on the media hosting service, the identifier of the content item to cause the content item to be presented on the second client device with the modified metadata.

2. The method of claim 1, wherein the identifier:
   indicates a location of the content item stored by the media hosting service; and
   includes a flag indicating that an original description of the content item is to be modified, wherein the flag is set in response to the receiving of the input of the first user associated with the first user account to modify the metadata of the content item.

3. The method of claim 1, wherein the receiving of the input of the first user associated with the first user account to modify the metadata of the content item comprises:
   causing the identifier of the content item to be modified.

4. The method of claim 1, further comprising at least one of:
   receiving a notification via the media hosting service that the second client device associated with the second user account on the media hosting service has received the identifier of the content item; or
   receiving a notification via the media hosting service that the media hosting service has received a request to cancel the modification of the metadata of the content item from the second client device associated with the second user account on requested.

5. The method of claim 1, wherein the popularity indicator for the content item comprises at least one of a number of views or ratings by the one or more users associated with user accounts on the media hosting service.

6. The method of claim 1, wherein:
   the obscuration comprises at least one of blanking or blocking out the metadata;
   the removal comprises refraining from displaying the metadata; and
   the replacement comprises providing an image or a text in place of the metadata.

7. The method of claim 1, further comprising:
   uploading the content item to the media hosting service from the first client device associated with the first user account on the media hosting service.

8. A system comprising:
   a memory; and
   a processor, operatively coupled to the memory, to:
   present, via a graphical user interface (GUI) of at a first client device associated with a first user account on a media hosting service, a content item and metadata associated with the content item provided by the media hosting service, wherein the metadata comprises at least one of a title, an identification number, an author, a tag, or a popularity indicator for the content item;
   receive, at the first client device, an input of a first user associated with the first user account to modify the metadata of the content item, wherein a modification of the metadata comprises at least one of an obscuration, removal, or replacement of the metadata;
   obtain an identifier of the content item, the identifier of the content item indicating the modification of the metadata of the content item; and
   send, to a second client device associated with a second user account on the media hosting service, the identifier of the content item to cause the content item to be presented on the second client device with the modified metadata.

9. The system of claim 8, wherein the identifier:
indicates a location of the content item stored by the media hosting service; and
includes a flag indicating that an original description of the content item is to be modified, wherein the flag is set in response to the receiving of the input of the first user associated with the first user account to modify the metadata of the content item.

10. The system of claim 8, wherein to receive the input of the first user associated with the first user account to modify the metadata of the content item, the processor further to:
cause the identifier of the content item to be modified.

11. The system of claim 8, the processor further to perform at least one of:
receive a notification via the media hosting service that the second client device associated with the second user account on the media hosting service has received the identifier of the content item; or
receive a notification via the media hosting service that the media hosting service has received a request to cancel the modification of the metadata of the content item from the second client device associated with the second user account on requested.

12. The system of claim 8, wherein the popularity indicator for the content item comprises at least one of a number of views or ratings by the one or more users associated with user accounts on the media hosting service.

13. The system of claim 8, wherein:
the obscuration comprises at least one of blanking or blocking out the metadata;
the removal comprises refraining from displaying the metadata; and
the replacement comprises providing an image or a text in place of the metadata.

14. The system of claim 8, the processor further to:
upload the content item to the media hosting service from the first client device associated with the first user account on the media hosting service.

15. A non-transitory computer-readable medium, the non-transitory computer-readable medium having recorded thereon instructions that when executed by one or more computer processors, perform operations comprising:
presenting, via a graphical user interface (GUI) of a first client device associated with a first user account on a media hosting service, a content item and metadata associated with the content item provided by the media hosting service, wherein the metadata comprises at least one of a title, an identification number, an author, a tag, or a popularity indicator for the content item;
receiving, at the first client device, an input of a first user associated with the first user account to modify the presented metadata of the content item, wherein a modification of the metadata comprises at least one of an obscuration, removal, or replacement of the metadata;
obtaining an identifier of the content item, the identifier of the content item indicating the modification of the metadata of the content item; and
sending, to a second client device associated with a second user account on the media hosting service, the identifier of the content item to cause the content item to be presented on the second client device with the modified metadata.

16. The non-transitory computer-readable medium of claim 15, wherein the identifier:
indicates a location of the content item stored by the media hosting service; and
includes a flag indicating that an original description of the content item is to be modified, wherein the flag is set in response to the receiving of the input of the first user associated with the first user account to modify the metadata of the content item.

17. The non-transitory computer-readable medium of claim 15, wherein the receiving of the input of the first user associated with the first user account to modify the metadata of the content item comprises:
causing the identifier of the content item to be modified.

18. The non-transitory computer-readable medium of claim 15, further comprising at least one of:
receiving a notification via the media hosting service that the second client device associated with the second user account on the media hosting service has received the identifier of the content item; or
receiving a notification via the media hosting service that the media hosting service has received a request to cancel the modification of the metadata of the content item from the second client device associated with the second user account on requested.

19. The non-transitory computer-readable medium of claim 15, wherein the popularity indicator comprises at least one of a number of views or ratings by the one or more users associated with user accounts on the media hosting service.

20. The non-transitory computer-readable medium of claim 15, wherein:
the obscuration comprises at least one of blanking or blocking out the metadata;
the removal comprises refraining from displaying the metadata; and
the replacement comprises providing an image or a text in place of the metadata.

* * * * *